(12) United States Patent
Vera et al.

(10) Patent No.: US 10,887,301 B1
(45) Date of Patent: Jan. 5, 2021

(54) CLIENT REGISTRATION FOR AUTHORIZATION

(71) Applicant: United Services Automobile Association (USAA), San Antonio, TX (US)

(72) Inventors: Alejandro Vera, San Antonio, TX (US); Miguel Solis, Jr., San Antonio, TX (US); Hieu Nguyen, Southlake, TX (US); Jason Paul Hendry, Selma, TX (US); Nathan Mahoney, New Braunfels, TX (US); Debra Randall Casillas, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 134 days.

(21) Appl. No.: 16/218,191

(22) Filed: Dec. 12, 2018

Related U.S. Application Data

(60) Provisional application No. 62/597,754, filed on Dec. 12, 2017.

(51) Int. Cl.
*H04L 29/06* (2006.01)
*H04L 29/08* (2006.01)
(Continued)

(52) U.S. Cl.
CPC ...... *H04L 63/0807* (2013.01); *G06F 16/1824* (2019.01); *G06F 16/1834* (2019.01);
(Continued)

(58) Field of Classification Search
CPC ............... H04L 63/0807; H04L 9/0643; H04L 63/0884; H04L 67/16; H04L 2209/38; H04L 2209/56; H04L 63/10; H04L 63/102; G06F 16/1824; G06F 16/1834; G06F 21/30; G06F 21/44; G06F 21/445; G06F 21/60; G06F 21/62; G06F 21/6218; G06F 21/6245
See application file for complete search history.

(56) References Cited

U.S. PATENT DOCUMENTS

| 9,996,835 | B2* | 6/2018 | Dill | G06Q 20/40 |
| 2007/0136197 | A1* | 6/2007 | Morris | G06Q 40/02 |
| | | | | 705/44 |

(Continued)

*Primary Examiner* — Malcolm Cribbs
(74) *Attorney, Agent, or Firm* — Fish & Richardson P.C.

(57) ABSTRACT

Techniques are described for client registration for authorizing an aggregator service to access data on behalf of an application, through self-registration of an application client identifier and issuance of authorization token(s) based on the application client identifier. Implementations provide a technique for dynamic client registration that avoids the need for manual vetting and manual generation of the client credential grant. Additionally, the implementations described herein enforce domain values around the scope and/or purpose of the client grant. This allows for support of application providers through a single point of registration that supports multi-layer and channel. This also allows for support of a scalable authorization solution for any suitable number of clients. The dynamic client registration process adds an additional layer of security through the OAuth client grant and mutual authentication.

19 Claims, 7 Drawing Sheets

(51) Int. Cl.
*H04L 9/06* (2006.01)
*G06F 16/182* (2019.01)

(52) U.S. Cl.
CPC ........ *H04L 9/0643* (2013.01); *H04L 63/0884* (2013.01); *H04L 67/16* (2013.01); *H04L 2209/38* (2013.01); *H04L 2209/56* (2013.01)

(56) References Cited

U.S. PATENT DOCUMENTS

| | | | |
|---|---|---|---|
| 2010/0100952 A1* | 4/2010 | Sample | H04L 67/22 726/9 |
| 2011/0321131 A1* | 12/2011 | Austel | G06F 21/6236 726/4 |
| 2013/0086670 A1* | 4/2013 | Vangpat | H04L 63/102 726/8 |
| 2014/0282880 A1* | 9/2014 | Herter | H04L 63/08 726/4 |
| 2015/0058930 A1* | 2/2015 | Mitchell | H04L 63/08 726/3 |
| 2015/0312038 A1* | 10/2015 | Palanisamy | G06F 21/33 713/155 |
| 2017/0034172 A1* | 2/2017 | Biggs | H04L 63/08 |
| 2018/0034795 A1* | 2/2018 | Los | G06F 21/335 |
| 2018/0262510 A1* | 9/2018 | Su | G06F 21/6218 |
| 2018/0337784 A1* | 11/2018 | Jain | H04L 9/3213 |
| 2020/0007316 A1* | 1/2020 | Krishnamacharya | H04L 9/3239 |

* cited by examiner

CLIENT REGISTRATION FOR AUTHORIZATION

CROSS-REFERENCE TO RELATED APPLICATION

The present disclosure is related to, and claims benefit from, U.S. Provisional Patent Application Ser. No. 62/597,754, titled "Client Registration For Authorization," which was filed on Dec. 12, 2017, the entire contents of which are incorporated by reference into the present disclosure.

BACKGROUND

Various online services are available that provide a user with assistance in accessing, analyzing, and providing context regarding user data, such as financial data. For example, an aggregator service may, with the user's permission, collect the user's data from various banks, investment services, insurance providers, and/or other services that make the data available to the user online, with appropriate security measures to ensure privacy and data security. An aggregator service may aggregate data from multiple such services to provide information that the user can access for financial planning, budgeting, and/or other purposes.

Open Authorization (OAuth) is a widely used standard for access delegation, which provides a mechanism for a user to grant an application access to the user's information that is maintained by other services, without the requiring the user to provide the application the user's access credentials (e.g., username, password, etc.) for the other services. This mechanism enables users to share information about their accounts with third party applications or websites in a secure fashion, without distributing their access credentials.

SUMMARY

Implementations of the present disclosure are generally directed to client registration for authorization. More specifically, implementations are directed to authorizing access to an aggregator service on behalf of an application through self-registration of an application client identifier and issuance of authorization token(s) based on the application client identifier.

In general, innovative aspects of the subject matter described in this specification can be embodied in methods that include actions of: receiving, at an authorizing service, a first communication from an aggregator service requesting issuance of an application client identifier (ID) that is associated with both the aggregator service and an application, wherein the aggregator service is requesting issuance of the application client ID to access the authorizing service on behalf of the application; in response to the first communication, generating, by the authorizing service, the application client ID and issuing the application client ID to the aggregator service; receiving, at the authorizing service, a second communication from the aggregator service requesting issuance of at least one authorization token for an end-user of the application, the second communication including the application client ID; and in response to the second communication, generating, by the authorizing service, the at least one authorization token and issuing the at least one authorization token to the aggregator service that employs the at least one authorization token to access the authorizing service on behalf of the application.

Implementations can optionally include one or more of the following features: the first communication indicates at least one scope governing the access to the authorizing service; the at least one authorization token provides the access according to the at least one scope; the first communication indicates a purpose for the access to the authorizing service by the application; the application client ID is generated and issued based at least partly on determining that the at least one scope is appropriate for the purpose; the at least one authorization token is generated and issued based at least partly on receiving permission, from the end-user, to access data of the end-user maintained by the authorizing service; the first communication indicates at least one scope governing the access to the authorizing service; the at least one authorization token provides the access according to the at least one scope; the permission is provided to access the data of the end-user according to the at least one scope; the permission is received through a user interface (UI) dialog that is presented to the end-user by the aggregator service; the first communication includes a logo of the application; the UI dialog is presented with the logo; the at least one authorization token includes a refresh token and an access token; the at least one authorization token is associated with a blockchain in a block that corresponds to the aggregator service; and/or the at least one authorization token is a hashed version of a block address of a record in the block.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure can be apparent from the description and drawings, and from the claims.

DETAILED DESCRIPTION

Figure 1:
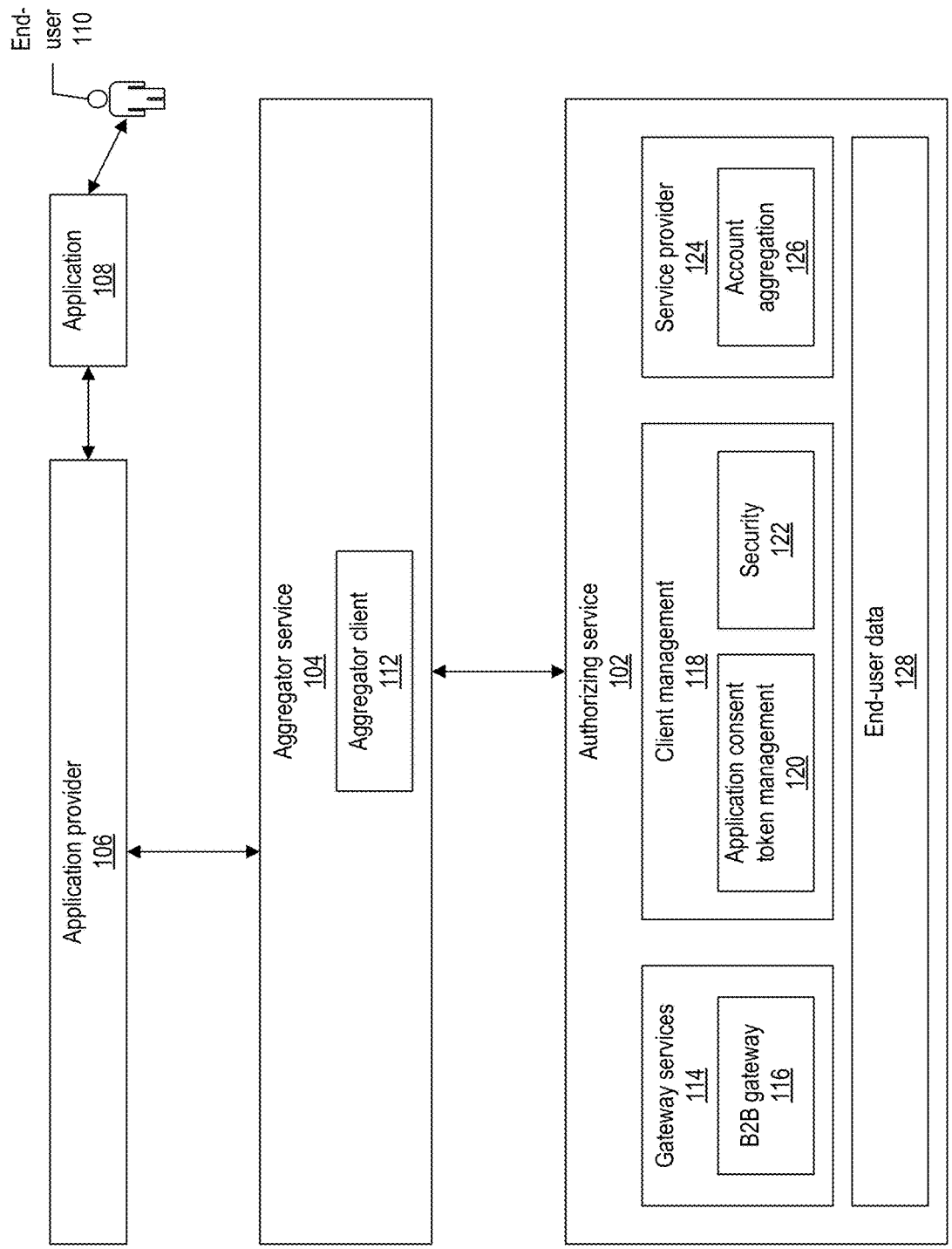
FIG. 1 depicts an example system architecture for account aggregation, according to implementations of the present disclosure.

Implementations of the present disclosure are directed to systems, devices, methods, and computer-readable media for client registration for authorizing an aggregator service to access data on behalf of an application, through self-registration of an application client identifier and issuance of authorization token(s) based on the application client identifier. Previously available solutions provided a manual process for generating a credential grant for a client, such as a credential grant according to a version of the Open Authorization standard (OAuth). Such a manual process, according to previously available solutions, requires manual vetting of each client, and is thus inefficient and not scalable. Implementations provide a technique for dynamic client registration that avoids the need for manual vetting and manual generation of the client credential grant. Additionally, the implementations described herein enforce domain values around the scope and/or purpose of the client grant. This allows for support of application providers through a single point of registration that supports multi-layer and channel. This also allows for support of a scalable authorization solution for any suitable number of clients. The dynamic client registration process adds an additional layer of security through the OAuth client grant and mutual authentication.

Implementations provide an approach that delegates trust of application providers though an established partner trust. Registration also captures registration risk through monitoring and analytics allowing an organization (e.g., the authorizing service described below) to suspend or revoke a client grant. This can also support an approach of using blockchain systems to enable multi-client registration that identifies who is allowed access, though blockchain validation as described further below.

Implementations remove the dependency on static credentials and provide a mechanism that supports multifactor authentication to protect user assets and information. Users may also be described as members or customers. Implementations support any suitable number of users' personal finance management needs securely, by giving users control of their data through access permission that the users can grant according to at least one scope for the access that is being requested by an application. Implementations provide data sharing standards, approach, and technology solutions to support an aggregator service model, to provide a secure, comprehensive interface for external user activity such as activity that is managed by an aggregator service (also described herein as an aggregator). For example, a user can choose to grant access to their financial accounts through third party Personal Finance Manager (PFM) solutions. Traditionally, such solutions "screen scrape" or utilize a legacy OFX standard which requires login credentials provided by the user. Implementations provide a dynamic OAuth-based authorization solution that facilitates such access. In particular, at least some implementations adopt an aggregator service model following the Financial Data Exchange (FDE) (previously the Financial Services Information Sharing and Analysis Center) Durable Data API standard using OAuth 2.0 or other suitable OAuth version. Other authorization standards may also be used. Implementations provide a secure, comprehensive interface for third party data access.

Through the implementations described herein, users are provided with visibility and control of which aggregator and/or application provider has access to their end-user data, such as financial account information of the user. Users may be able to specify multi-factor authentication for their self-service account accesses and still use account aggregation and/or application solution. Users may be able to provide consent to what data (e.g., what scope of data) aggregators and/or application providers are granted access to. In some instances, a particular aggregator and/or application provider may be required to have an agreement in place with the authorizing service, to enable the user to use that aggregator and/or application provider through the implementations described herein. Implementations generally provide improved security for user data, compared to previously available solutions.

Implementations provide a secure data sharing ecosystem that supports data aggregators, aggregator clients, and/or applications that provide data to users. The data provided is accurate, in that the data meets data quality control standards, with data attributes that are defined and understood between parties. Implementations provide data availability, such that users have the ability to view their data in a secure third party application. Implementations provide transparent user consent, through which users provide explicit consent delegating access to their data according to one or more scopes. Implementations also allow the user to view and revoke consent for delegated access. Implementations provide a reliable mechanism for data access, such that user data is made available in a timely manner consistent with the underlying core system data availability. Moreover, user data is transported in a secure manner that meets data sharing restrictions, which may be described in an aggregator agreement between aggregator and authorizing service. In some implementations, the data sharing interface is a living interface in which requests for enhancements may be reviewed and approved through a suitable governing process. In some implementations, the data access is scoped according to application functionality. For example, aggregators and/or application providers obtain user consent and only request access to the data that meets the minimum amount of data required for the end-user.

FIG. 1 depicts an example system architecture for account aggregation, according to implementations of the present disclosure. FIG. 1 provides an example of a high-level view of an account aggregation architecture, showing the manner in which external parties can interact with the exposed services of the authorizing service through various channels (e.g., mobile, web, etc.), utilizing a gateway infrastructure to provide access to customer data. Such an architecture provides access to user data in a secure and responsible manner.

As shown in the example of FIG. 1, an authorizing service 102 communicates with an aggregator service 104 over one or more networks. The aggregator service 104 communicates with an application provider 106 over one or more networks. The application provider 106 supports an application 108 (e.g., mobile app, web site, etc.) that is accessible by an end-user 110 using a suitable computing device. The authorizing service 102 may maintain end-user data 128 for the end-user 110. In some instances, the end-user data 128 is financial information of the end-user 110, such as information related to bank accounts, credit cards, consumer loans, mortgage loans, home equity, life annuities, insurance coverage, property, investments, user profile information, and so forth. The aggregator service 104 may interact with the authorizing service 102 to access the end-user data 128 on behalf of the application provider 106, e.g., to present at least a portion of the end-user data 128 in the application 108 to the end-user 110.

The aggregator service 104 may execute an aggregator client 112, which provides an interface to the application provider 106. In some implementations, the authorizing service 102 executes gateway services 114, including a business-to-business (B2B) gateway 116. In some implementations, the authorizing service 102 executes client management module(s) 118, such as modules for application consent token management 120 and/or security 122. The authorizing service 102 may also execute a service provider 124, includes an account aggregation module 126.

An aggregator may seek to onboard client applications that utilize their services. Authorization tokens, such as OAuth tokens, may be issued based on who the end-consumer of the data is. For example, an application provider such as a bank may provide an application (e.g., mobile app) that enables a user to view the user's financial data maintained by other banks, and such access may be obtained through an aggregator service. In previously available solutions, a client identifier (ID) is issued to the aggregator, and may be described as an aggregator client ID. Authorization token(s) such as OAuth access tokens are issued to the aggregator to be used on behalf of the application provider. The aggregator may be described as a mediation later (e.g., middleman) for various third party applications, in that the aggregator may set up connections with the various banks and add value for third party applications by aggregating information from different banks for the same end-user. As described above, the current process for client ID issuance is a manual process, in which the aggregator communicates with the authorizing service and provides an application name, description, and scope, where the name indicates the end-consumer application. The authorizing service creates the client ID and provides it to the aggregator. In this traditional scenario, the client ID identifies the aggregator (e.g., according to the OAuth specification). The aggregator uses the client ID to request an access token (e.g., an OAuth token) from the authorizing service, which is generated and sent to aggregator to use in accessing various data sharing APIs.

Figure 2:
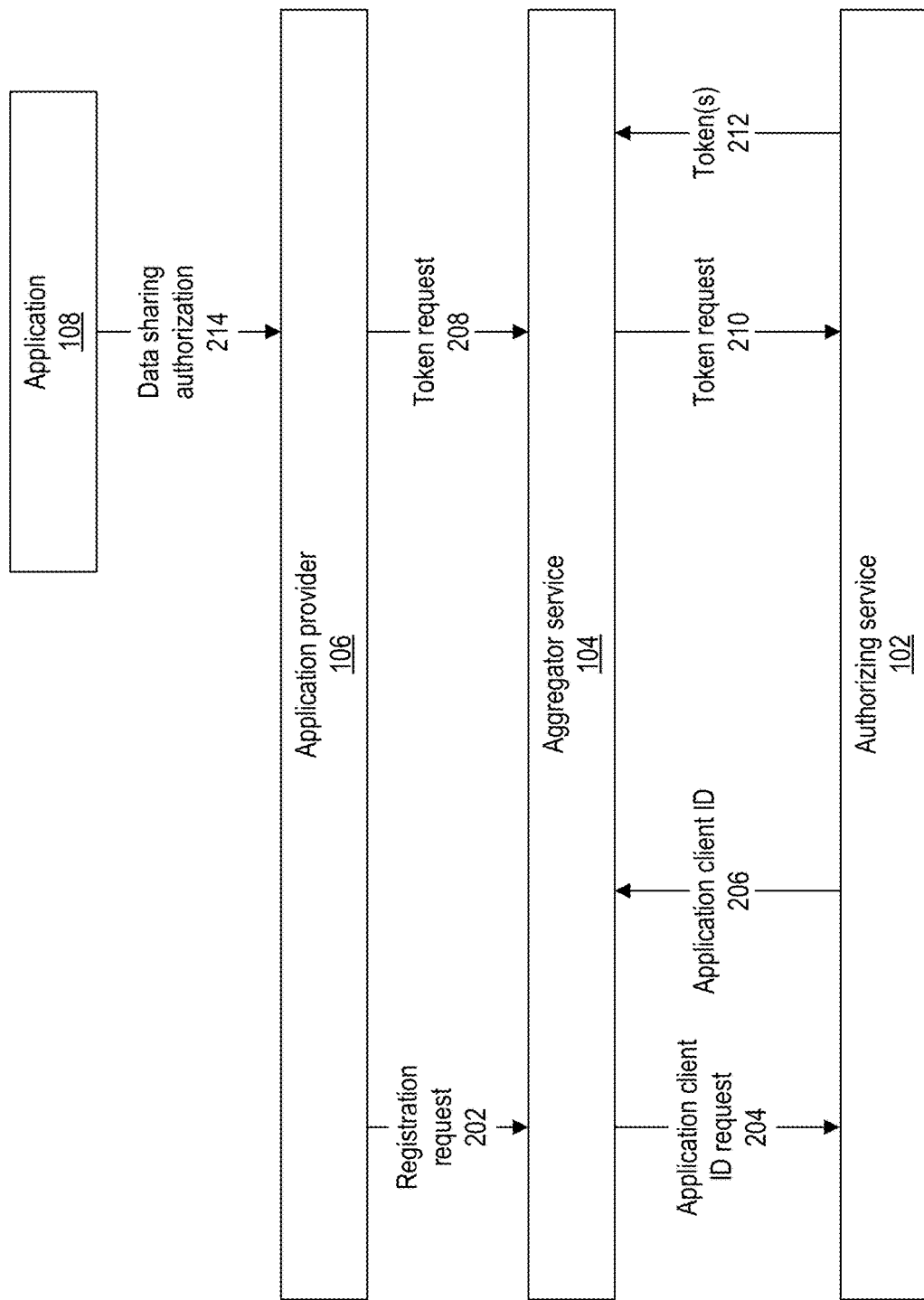
FIG. 2 depicts an example flow diagram for client registration and token issuance for account aggregation, according to implementations of the present disclosure.

FIG. 2 depicts a flow diagram of an example process for client registration and token issuance for account aggregation, according to implementations of the present disclosure. Operations of the process may be performed by one or more of the authorizing service 102, the aggregator service 104, the application provider 106, and/or the application 108.

A first phase of the process is described as application client ID self-registration. In this first phase, the application provider sends a registration request 202 to the aggregator service 104. The aggregator service sends an application client ID request 204 to the authorizing service. In response, the authorizing service generates an issues an application client ID 206 to the aggregator service 104.

In the request 202, the third party application provider sends information to aggregator indicating a request for data aggregation for end-users. The request can include an application ID, application name, logo for the application, description of the application, and/or other information. On receiving the request 202, the aggregator service can send the application client ID request 204 to the authorizing service. The request 204 can include information such as the application name, aggregator name, application logo, application description, at least one scope of data being requested, a purpose for the application, a redirect uniform resource indicator (URI), and/or other information.

The scope(s) can include one or more types of data that the application is to be given access to, such as bank data, deposits, credit card information, loan information, and so forth. Accordingly, a scope can be a subset of the end-user data maintained by the authorizing service, a subset that the end-user consents to sharing with the application.

The redirect URI is a destination where authorization token(s) are to be sent. The logo is provided to enable a seamless user experience from the end-user standpoint, and may be included in the dialog presented to the user to request their permission for data access.

On receiving the request 204, the authorizing service uses the information in the request 204 to generate the application client ID 206, which is sent to the aggregator for subsequent use in requesting token(s).

In some implementations, the aggregator provides a purpose for the application, for example, indicating that the application has a purpose pooling data for personal financial management. The authorizing service may perform a check to verify that the indicated purpose is consistent with the requested scope(s) for data access. If the purpose is not consistent with the scope(s), the request for the application client ID may be denied. For example, a purpose of personal financial management may be consistent with scopes for bank account information, investment details, and so forth, but may be inconsistent with other types of data.

The logo can be used in the UI dialog that is presented to the user when obtaining their consent to share the data. The request 204 and/or 202 can also include information relevant to the application, such as contact information, name, email address, phone number, URL, and so forth.

A second phase of the process is described as token issuance. In this second phase, the application provider 106 sends a token request 208 to the aggregator service 104. The aggregator service sends the token request 210 to the authorizing service. In response, the authorizing service generates and issues one or more tokens (e.g., OAuth tokens) to the aggregator service, such as access and refresh tokens. The token(s) are then uses to access the end-user data, maintained by the authorizing service, on behalf of the application. In some implementations, the end-user may use the application to provide their authorization 214 for data sharing. Such authorization may be according to one or more scopes for data access, as described further below. The token(s) 212 may be issued responsive to receiving the end-user's authorization 214.

The user may be asked to consent to each scope element that the application is seeking access to. Such consent may be obtained through a UI dialog presented to the user through the application. The authorization 214 may indicate whether the user consents, and which requested scope(s) the user consents to. If the user consents to only some of the requested scopes, the token(s) issued may enable access to the consented scopes but not the other scopes. In some instances, the user may consent to at least one scope in order for the tokens to be issued. The dialog may provide a warning that if the user does not consent to all the requested scope(s), the application may not function as intended. In some implementations, the aggregator is requested not to ask for more scope (on behalf of an application) then the application needs in order to satisfy the purported purpose at the intended service level.

In the token request 210, the aggregator can send the application client ID with the requested scopes, and the dialog may be generated and presented to the end-user responsive to receiving the request 210 at the authorizing service. Based on the user's consent to one or more scopes, the token(s) 212 are generated to provide access according to the consented scope(s). The token(s) 212 can include an access token and a refresh token. The refresh token may be usable for a period of time (e.g., 18 months), after which authorization may be performed again. The access token grant access to the data, according to the consent scope(s). Both token(s) may be specific to the particular end-user, and may grant access to that end-user's data maintained by the authorizing service.

Implementations provide a mechanism by which the application client ID is programmatically (e.g., dynamically) generated for the aggregator. The application client ID is specific to a particular pairing of aggregator and application. For example, aggregator A may be issued an application client ID AB for use on behalf of application B, and aggregator A may be issued a different application client ID AC for use on behalf of a different application C. The application may be described as subordinate to (or sponsored by) the aggregator, such as the aggregator is accessing the end-user data on behalf of the application as a subordinate actor. In some implementations, suspending an application client ID blocks access by the aggregator on behalf of the particular application, but still allows access by the aggregator on behalf of other applications. Suspending the overall aggregator client ID for an aggregator, causes the suspension of all subordinate application client IDs under that aggregator.

In some implementations, the mechanism supports a self-describing hierarchy of applications to client tokens, such that a parent client can have dependent clients each with its own independent scope. A child can subscribe to the scopes that are authorized for the parent. For example, an aggregator as the parent may have a set of scopes that are allowed for that aggregator, and the applications that are children of the parent can only have access to those scopes that are authorized for the parent aggregator. A change to the allowed scopes at the aggregator level propagates to the children as well. For example, removing account information access to an aggregator causes such access to be removed for the applications that the aggregator is acting on behalf of.

In some implementations, the network communications between the various entities shown in FIGS. 1 and 2 are secured using a version of secure sockets layer SSL or transport layer security (TLS), such as through a handshake over a protocol such as HTTPS, or some other suitable communications security technique. Access to the aggregator may be granted if the IP address or other identifier of the aggregator is present on a white list (or absent from a black list) maintained by the authorizing service.

In some implementations, the aggregator service first registers for access to be able to request client IDs for the various application providers supported by the aggregator service (e.g., their partners), and the authorizing service vets the aggregator service to ensure suitability (e.g. the aggregator is trusted) for requesting client IDs. In this way, the aggregator service is initially granted the right to request client IDs, prior to requesting the client IDs. In some implementations, the aggregator service registers for an API that would allow client ID requests using a scope specific to the type of request, e.g., with appropriate limitations on what the aggregator service can request as their access scope.

In some implementations, the authorization service present a consent UI (e.g., the dialog presented to the end-user, as described above) to verify that the end-user gives consent, and/or the authorization service may otherwise determinate the consent of the end-user to the various scope(s) of access.

In some implementations, a blockchain network or other suitable data storage mechanism can be used for token issuance and maintenance. A block in a blockchain may maintain a list of all the client applications within a particular aggregator token, and every interaction or request can be tracked on the block. For example, one token can be issued for the aggregator, for the various client applications supported by the aggregator, and the block may hold a history of access requests for each application made by the aggregator. The use of the blockchain provides an immutable record of every action taken by the aggregator on behalf of its various supported applications, and provides a transparent, efficient mechanism for auditing of access requests. In such implementations, the application client ID is tied to an immutable ledger record on the block for the aggregator, and the address of that record is used to generate access tokens. The access tokens in such cases are the address of the record on the block. For every access request received, the current blockchain record can be validated by comparing it to the previous record and, if they match, the request is determined to be a valid request. As the token, a hashed version of the block address where the record is stored can be issued to the aggregator for use on behalf of the application. Accordingly, the issued token is a blockchain record address.

A blockchain, which may also be referred to as a distributed ledger, is a (e.g., public) ledger of all transactions that have been executed in one or more contexts (e.g., negotiable instrument transactions, digital currency transactions, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, all entities can agree on which transactions have actually occurred, and in which order. For example, if two entities observe different transaction histories, they can be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner demonstrates a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value is to have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

Figure 3:
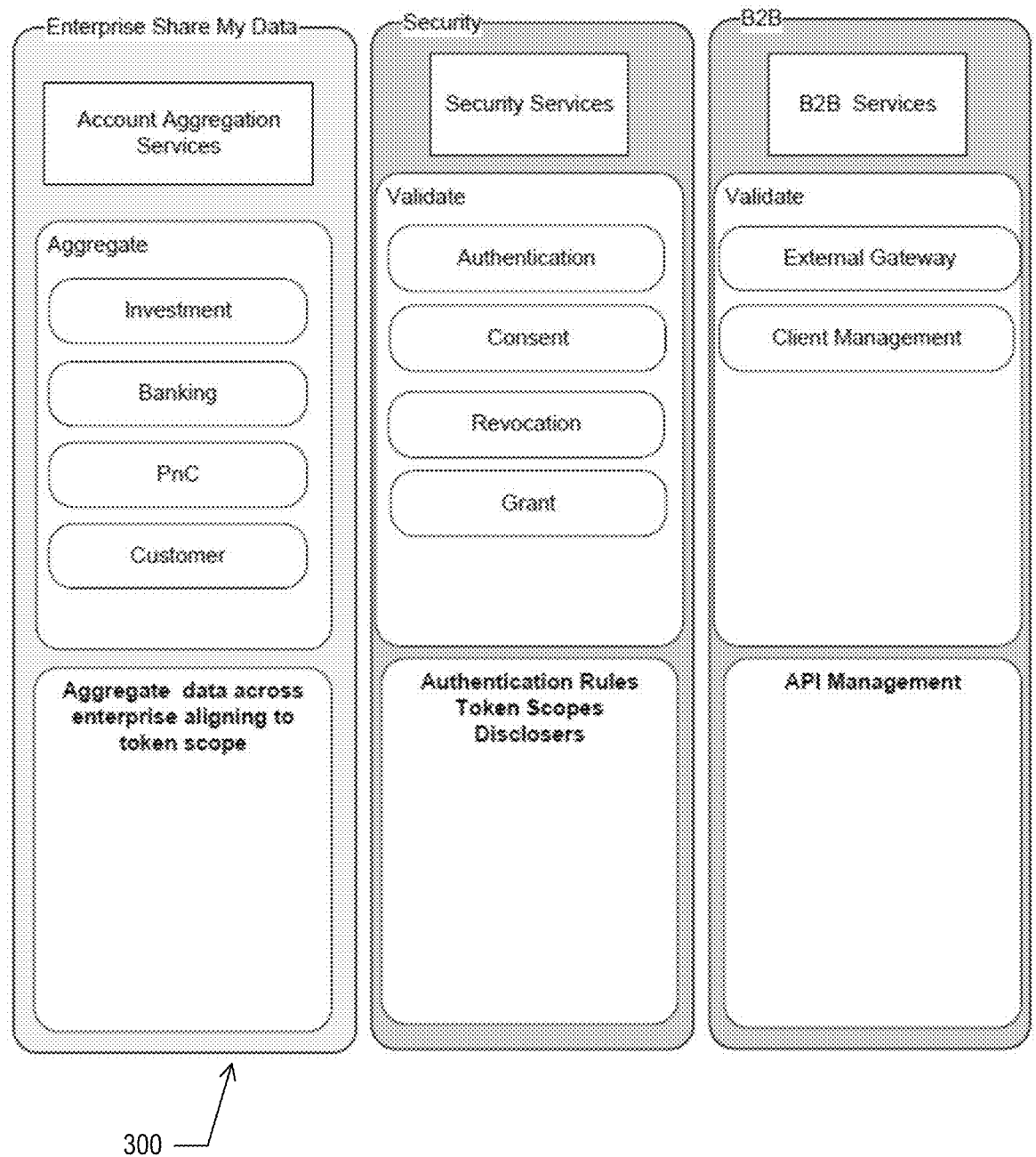
FIG. 3 depicts an example account aggregation component architecture, according to implementations of the present disclosure.

FIG. 3 depicts an example account aggregation component architecture, according to implementations of the present disclosure. The account aggregation component architecture as shown in FIG. 3 outlines an approach for dealing with points of interaction. This approach is well-suited for applications that orchestrate activities between components and utilize output from one component as input into another.

To encapsulate the underlying internal structure of the authorizing service and to prevent exposure of the authorizing service proprietary data elements, a data sharing standard can be published as a facade through an external API portal. This portal can facilitate the management of the published API, establish the security for API interactions and initiate registration requests.

In some implementations, one or more of the following features are supported:

The Gateway can enforce Refresh and Access tokens following OAuth 2.0 Standard.

B2B communication between client and the authorizing service can be secured via HTTPS/TLS with Mutual Authentication.

The Aggregator(s) and/or Application Provider(s) can have a unique Client ID.

Each Aggregator or Application Provider can provide data sharing detail to the authorizing service at a mutually agreed upon frequency.

Data request can follow pull model initiated by the Aggregator or Application Provider.

The authorizing service can post a refresh token to the registered Aggregator or Application Provider Redirection End Point.

Last access time can be captured for refresh tokens.

Access token use can be recorded for audit and analytics.

The authorizing service can follow an OAuth 2.0 implementation with scopes defined by the Application Provider.

OAuth 2.0 tokens can have multiple scopes.

Refresh tokens can expire no later than 18 months from the date it was issued.

Access tokens can expire every 24 hours.

The FDE Durable Data Specification is a minimal viable specification and the authorizing service can extend capabilities as appropriate.

In some examples, the authorizing service may not follow the POST-only RESTful implementation of DDA, and instead follow a CRUD RESTful implementation of Durable Data API.

The authorizing service can have end points to include the line of business and version.

The authorizing service can add a Property and Casualty (Insurance) and Tax entities.

The authorizing service may not implement funds transfer.

External Data Aggregation services can be read only.

Customer and Account resource identifiers can be Universal Unique Identifiers (UUIDs).

The Payment Card Industry Data Security Standard (PCI-DSS) data can be masked.

Highly sensitive customer Personally Identifiable Information (PII) data can have its own scope and resource.

Partners who are B2B-only customers may not require explicit consent.

Aggregators or Application Providers can have six months to move to any new version of the API.

A Consent Process on a customer owned device can require use of a native browser.

Customer owned devices may not be able to directly connect to the account-aggregation API (See Interaction with the authorizing service).

With the introduction of the open authentication standard with a formal explicit consent and revocation process, the Aggregators and/or Application Providers may be required to register with the authorizing service. This process creates a formal data sharing agreement and establishes guidelines and how to utilize these services. The Aggregator is an entity that collects customer data from an institution and makes that information available to Aggregator Clients or Application providers. The Aggregator Client is an Entity that is not a customer facing application that uses an Aggregator to collect customer information to make that information available to Aggregator Clients or Application providers. The Application Provider is a customer facing application that delivers a product or service using customer data using an Aggregator and/or direct connection.

Figure 4:
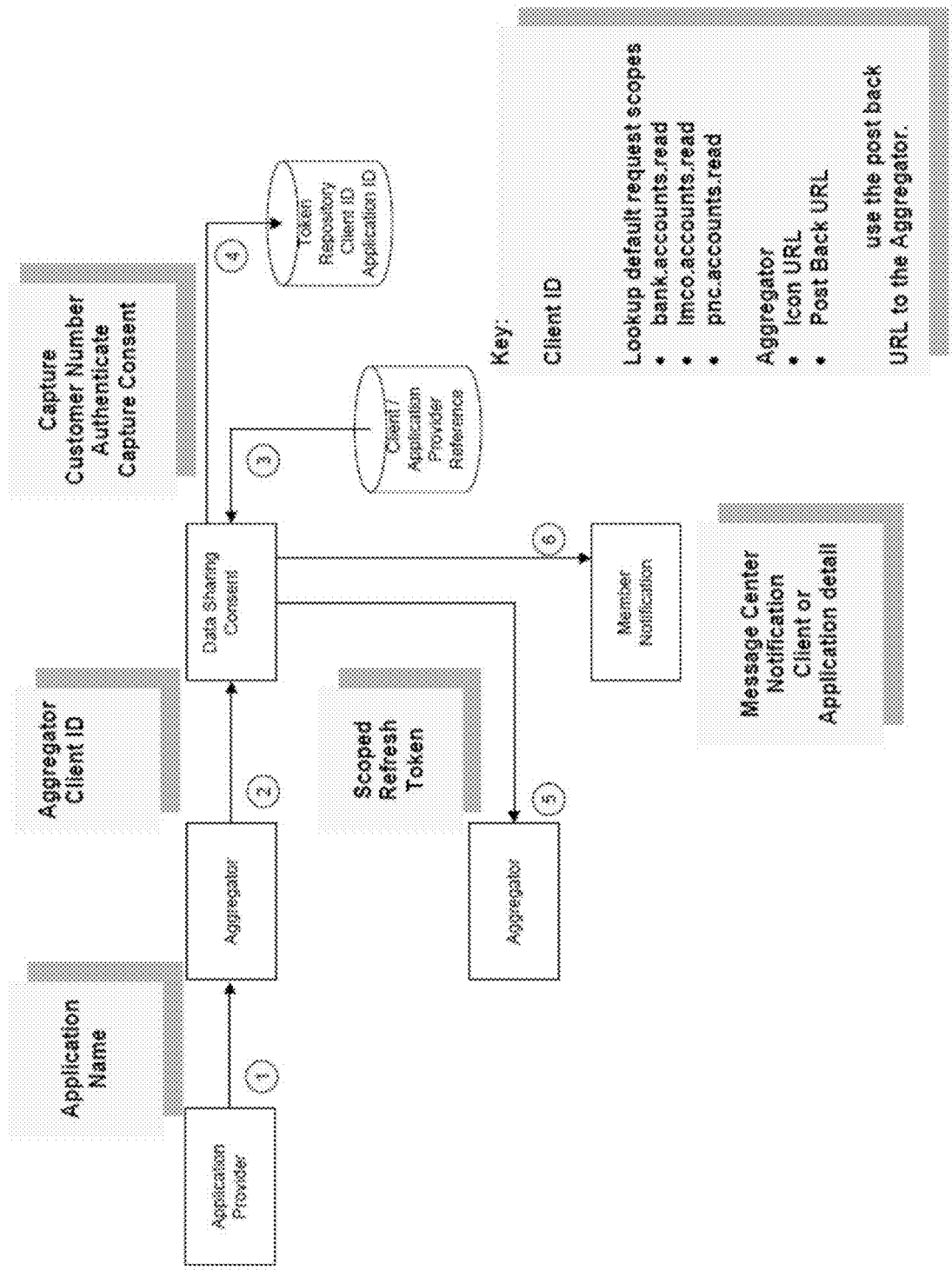
FIGS. 4-6 depict example flow diagrams for consent interaction, according to implementations of the present disclosure.
Figure 5:
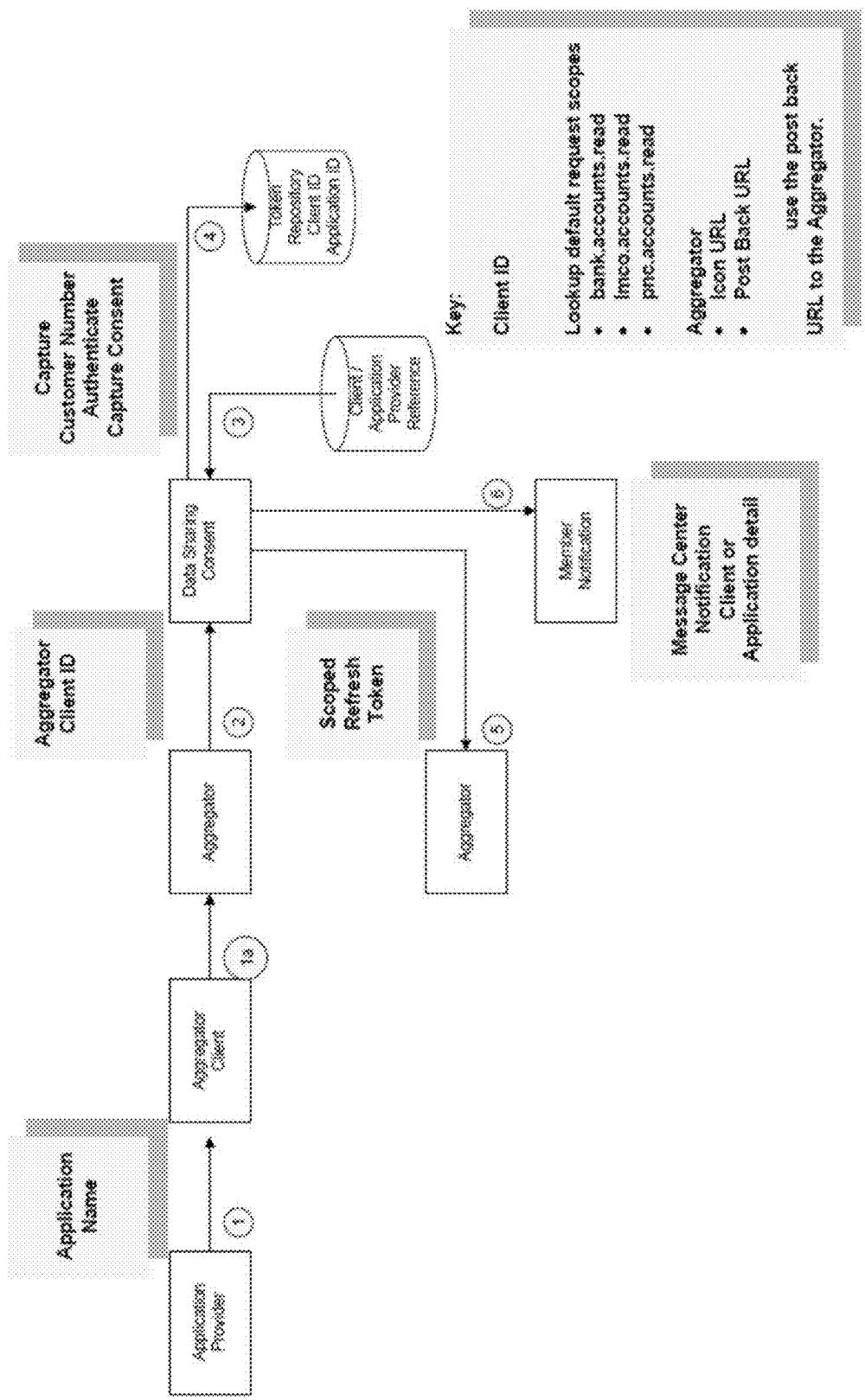
Figure 6:
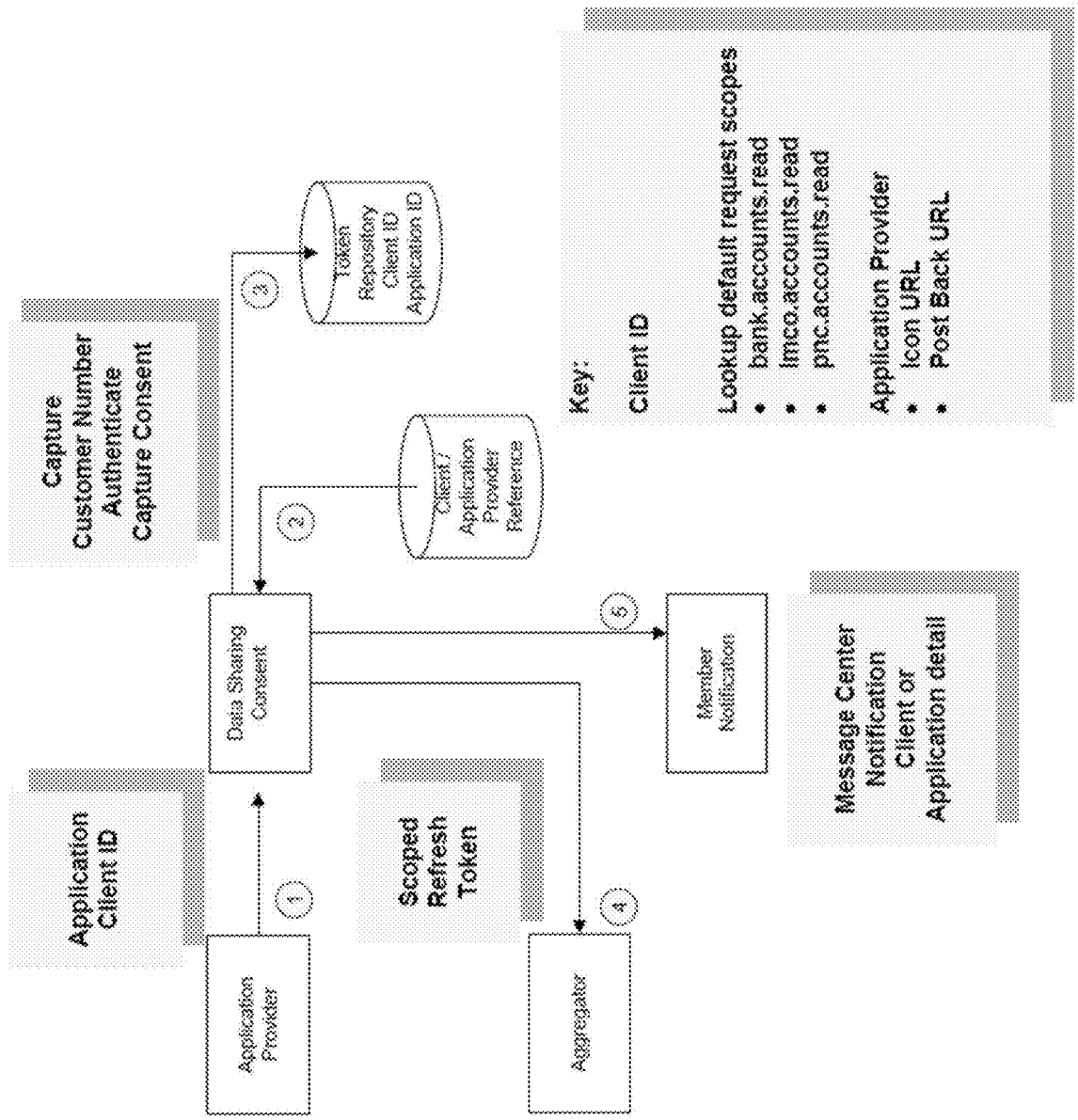

FIGS. 4-6 depict example flow diagrams for consent interaction, according to implementations of the present disclosure. Such consent interaction may be between an Aggregator, Application Provider, and the authorizing service FIG. 4 provides an example of how to handle an Application Provider though an Aggregator. In this use case, an Application Provider (e.g., bank) is interacting with an Aggregator (e.g., bank, IMCO, PnC, etc.). The post back/redirect URL can be to the Aggregator and they can handle the token exchange. One token can be issued to the Aggregator on the behalf of the Application Provider. The scope associated to the Application Provider token is what is applied during the service inquiry.

FIG. 5 provides an example of how to handle an Application Provider through an Aggregator and Aggregator Client. In this use case, an Application Provider (e.g., bank) is interacting with an Aggregation Client (e.g., Bank, IMCO), which is interacting with an Aggregator (e.g., bank, IMCO, PnC). In this case, the end application (Application Provider) needs bank data. The Aggregation Client and Aggregator both pass reference to the Application Provider. The Aggregation Client does not handle the token exchange, and that is the responsibility of the Aggregator. The Aggregation Client does not need to register as the authorizing service client and is effectively unknown to the authorizing service. It is expected an Aggregator Client aligns to the Aggregator Restrictions as outlined in the Aggregator Agreement.

FIG. 6 provides an example of how to handle an Application Provider (e.g., only). In this use case, the Application Provider (e.g., bank) is being handled by itself. In this case, the end application (Application Provider) needs bank data. The Application Provider handles the token exchange. The Application Provider needs to register as a client with the authorizing service. It is expected an Application Provider enforces to the Aggregator Restrictions as outline in the Aggregator Agreement.

For integrating with the authorizing service through a mobile device, two use cases may be supported in some implementations. In the first use case, the Consent Process initiated from a customer owned device. In the second use case, the Customer owned device calls the account-aggregation API. In some implementations, the authorizing service may not process API requests coming from a customer device. The authorizing service can process native browser requests for consent process, if the Application Provider has been confirmed as genuine, is running on current technology, and can provide evidence that show no signs of a device has been tampered with or installed on a compromised device. Some implementations may require that the device has current versions installed of the OS and Application Provider, Detection/Prevention of anti-malware is current and running on the device, the Application provider code is obfuscated/encrypted to prevent disassembly, and/or the Application is digitally signed by a recognized party.

The Application Provider is making a request on behalf of the customer and the Application Provider may be required to match the identity registered with that device prior to making the request on the behalf of the customer.

The authorizing service consent process may require the launch of a hosted site, such as the UI dialog described herein. Native browsers can be used to launch the hosted consent process. In some implementations, the authorizing service does not support application embedded WebView objects which could be used to launch the consent process in a native application.

For access through an API, Application Providers may be required to follow a client server model for API calls. The Application provider may not directly call the API via a customer device. The authorizing service can establish mutual authentication for a trusted server which can be able to interact with the account-aggregation API. Connections to the API gateway may not be supported for customer devices.

To gain access to the Data Sharing API, an Aggregator and/or Application Provider enters into an Aggregation Agreement with the authorizing service. Once an agreement has been entered into, the Aggregator or Application provider can provide one or more of the following information:

Redirection End Point. This is a callback URL for the tokens. (Both Refresh and Access).

Scope of authorization. This is the scope of the data you are requesting. See DDA Specification for listing of external defined scopes.

Application Provider Icon URL. This URL is used to display the application client icon during consent.

Revocation End Point. This is a callback URL when a customer revokes consent. The revoked token can be sent to the application provider.

Application Provider Display Name. This is the Name of the Application Provider to be displayed to the customer during the consent process.

Application Provider Capability. This can include one or more of Marketing, PFM(Categorization, Budget, Net Worth, Goals), Investments, Retirement Financial Planning, Taxes, Funds Availability, Digital Advice, Credit Risk Underwriting, Loan Application Prefill, Insurance, Bill Pay, and/or Peer to Peer Payments The client can be issued the following information:

Client ID, the assigned ID that represents the Aggregation and/or the Application Provider.

Client Secret, the Secret code to be included in subsequent API calls in combination with the Authentication Code Grant.

Authorization endpoint, the authorizing service authorization endpoint to generate an authorization (auth) code.

Token endpoints, the authorizing service token endpoint to generate access and refresh tokens.

An Authorization Code Grant is used by the consuming client with which the customer interacts. An example of a consuming client is an Application Provider or a Financial Institution. Behind the scenes, the Application Provider could access data through an intermediate client such as an Aggregator service. In some instances, the consumer only knows of the relationship as the Application Provider or Financial Institution. The authorization code grant may require the user to consent to the permissions requested. Once consent is given, an authorization code can be issued to the registered Aggregator or Application Provider, which the client agent can use to acquire an access token.

For an Aggregator Authorization Code Grant, the Authorization Code Grant can be a single or multi-scoped token. For Aggregators who manage multiple consuming Application Provider authorization grants, it is allowed to use the token with the greatest scope. However, it may be required that the Aggregator report on grants that are no longer in use.

The authorizing service can request that Aggregators only provide access to customer gathered information that has been consented to in accordance to the approved scope for said Application Provider grant. The authorizing service can provide approved scopes to the Aggregator agent upon consent. Additionally, the authorizing service can expect the aggregator to use the correct Application Provider grant when executing on demand request from the Application Provider. Example Code 1, below, provides a Post Back Example.

Example Code 1

Post Back Example.
{
"access_token": "d81b08d4-ed6b-4226-8853-d5d74e5b1885",
"token_type": "Bearer",
"expires_in": 86400,
"refresh_token": "06a1321b-7524-4635-a2b3-9d3b4f4c23e7",
"scope": "usaa.bank.accounts.read"
}

For an Application Provider Authorization Code Grant, the Authorization Code Grant can be a single or multi-scoped token. The authorizing service can expect that the Application Provider only request authorization from a customer that meets the application functional requirements. Once a customer has consented in accordance to the requested scope, the authorizing service can provide approved scopes to the Application Provider upon consent. Example Code 2, below, provides a Post Back Example.

Example Code 2

Post Back Example.
{
"access_token": "d81b08d4-ed6b-4226-8853-d5d74e5b1885",
"token_type": "Bearer",
"expires_in": 86400,
"refresh token": "06a1321b-7524-4635-a2b3-9d3b4f4c23e7",
"scope": "usaa.bank.accounts.read"
}

The refresh token can have an expiration determined based on the type of Aggregator or Application Provider relationship. For example, an expiration (e.g., duration) of 18 months may be provided for scopes such as Financial Information, Insurance, Customer Sensitive information, Tax data, and so forth. The duration may be extended by customer consent. Once a token has expired, the Aggregator or Application Provider can be required to obtain explicit consent from the end customer.

The Authorization Grant can be revoked according to various scenarios. For example, the authorizing service can revoke the Authorization Grant. Once a customer has issued a grant revocation, the registered Aggregator and/or Application Provider can be notified via a API response code or a 602 error code on the next use of the revoked token. The authorizing service can expect that, once a grant has been revoked, the customer's data can no longer be shared with the consuming Application Provider.

As another example, the Aggregator can revoke the Authorization Grant. Once a customer has requested the Aggregator to revoke authorization, the Application Provider can notify the authorizing service via Token Management API of the revocation. The authorizing service can expect that, once a grant has been revoked, the customer's data can no longer be shared with the consuming Application Provider.

As another example, the Application Provider can revoke the Authorization Grant. Once a customer has requested the Application Provider to revoke authorization, the Application Provider can notify the authorizing service via Token Management API of the revocation. The authorizing service can expect that, once a grant has been revoked, the customer's data can no longer be shared with the end consumer.

In some implementations, Aggregators and/or Application Providers can self-report on various metrics at an appropriate frequency, including but not limited to Customer Registration Request, Customer Request Frequency Report, Customer Use of Application Provider, Inactive Token Report, and/or Inactive Secondary Token Report.

In some implementations, the authorizing service can limit access or service bandwidth through the external gateway to protect the availability of the authorizing service with respect to internal and/or external facing applications. This includes the availability of the data aggregation API's. If an Aggregator or Application Provider impacts the availability of these services, the Aggregator or Application Provider can be Rate Limited until the authorizing service identifies root cause and deems availability has been restored.

In some implementations, the authorizing service can capture access and performance data. This data can be used to ensure the environment is healthy and able to support the request load. The authorizing service can track consent page requests identifying the client, requesting domain and IP address. API interactions can be tracked and can track the use of tokens, resources, request frequency, data volume; token scope; identified Application Provider and date/time of access.

Consent describes a Process in which the authorizing service obtains authorization to share information on the behalf of a customer. Consent can be Explicit and/or Implicit.

An Aggregator is an Entity that collects customer data from an institution and makes that information available to Aggregator Clients or Application providers.

An Aggregator Client is an Entity that is not a customer facing application that uses an Aggregator to collect customer information in order to make that information available to Aggregator Clients or Application providers.

An API is an Application Programming Interface.

An Application provider is a Customer facing application that delivers a product or service using an Aggregator or direct connection.

Authentication is the process of identifying a consumer, and confirming their the authorizing service relationship.

An Authorization Grant is an Authorization grant issued by the authorizing service on the behalf or a customer after explicit consent has been given by the customer.

A Client Grant is an Authorization Grant issued by the authorizing service for B2B partners that do not require explicit consent as consent is Implicit through the relationship with the authorizing service.

Explicit Consent is the process in which a member Authorizes an Aggregator or Application Provider to access customer resources.

A Financial Institution is an Entity that holds consumer accounts and provides products and services that generate financial data.

Implicit Consent is the process in which a customer authorizes a trusted provider through interaction with existing the authorizing service products or services.

Multi-scope tokens are an indication by an Aggregator or Application Provider that they seek access to a resource server in order to access one or many services of X on the resource server.

Open Authentication (OAuth) 2.0 is an authentication industry standard that provides a secure way for customers to authenticate and authorize access to data.

PCI-DSS is Payment Card Industry Data Security Standards.

PII is Personally Identifiable Information.

Token Scope is an indication by an Aggregator or Application Provider that they seek access to a resource server in order to access a service of X on the resource server.

Tokenized Authentication replaces a sensitive credential with a unique, non-sensitive identifier and is considered member authorization without additional Authentication.

Figure 7:
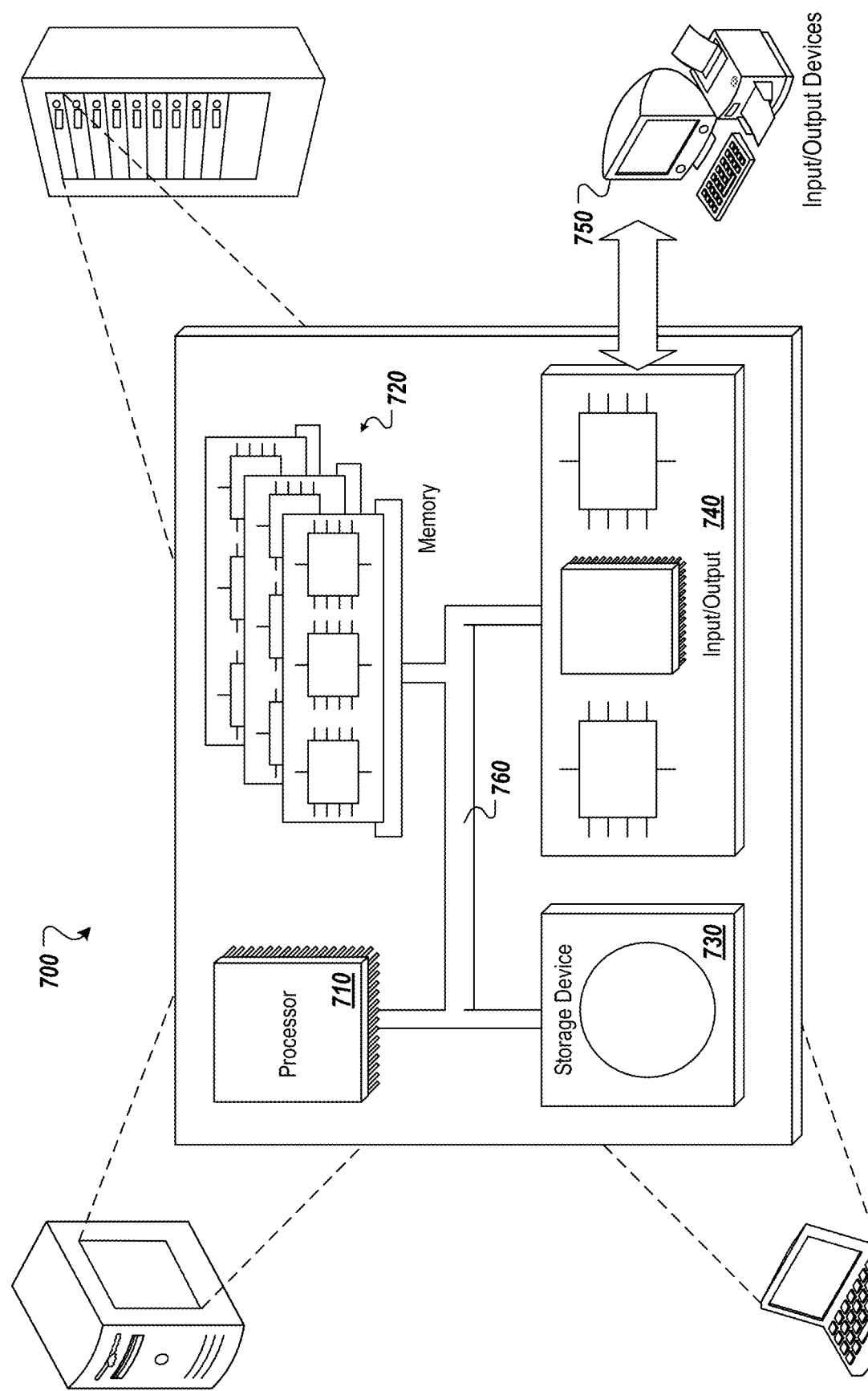
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in computing device(s) and/or system(s) that one or more of the application 108, the application provider 106, the aggregator service 104, and/or the authorizing service 102, and/or other computing device(s) or system(s) described herein. The system 700 may include one or more processors 710, a memory 720, one or more storage devices 730, and one or more input/output (I/O) devices 750 controllable through one or more I/O interfaces 740. The various components 710, 720, 730, 740, or 750 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it can be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by an authorizing service executed by at least one processor, the method comprising:
   receiving, at the authorizing service, a first communication from an aggregator service requesting issuance of an application client identifier (ID) that is associated with both the aggregator service and an application, the first communication indicating at least one scope governing access to the authorizing service, wherein the aggregator service is requesting issuance of the application client ID to access the authorizing service on behalf of the application;
   in response to the first communication, generating, by the authorizing service, the application client ID and issuing the application client ID to the aggregator service;
   receiving, at the authorizing service, a second communication from the aggregator service requesting issuance of at least one authorization token for an end-user of the application, the second communication including the application client ID; and
   in response to the second communication, generating, by the authorizing service, the at least one authorization token and issuing the at least one authorization token to the aggregator service that employs the at least one authorization token to access the authorizing service on behalf of the application,
   wherein the at least one authorization token is generated and issued based at least partly on receiving permission, from the end-user, to access data of the end-user maintained by the authorizing service, and
   wherein the at least one authorization token provides the access according to the at least one scope the permission is provided to access the data of the end-user according to the at least one scope.

2. The method of claim 1, wherein:
   the first communication indicates a purpose for the access to the authorizing service by the application; and
   the application client ID is generated and issued based at least partly on determining that the at least one scope is appropriate for the purpose.

3. The method of claim 1, wherein the permission is received through a user interface (UI) dialog that is presented to the end-user by the aggregator service.

4. The method of claim 3, wherein:
   the first communication includes a logo of the application; and
   the UI dialog is presented with the logo.

5. The method of claim 1, wherein the at least one authorization token includes a refresh token and an access token.

6. The method of claim 1, wherein the at least one authorization token is associated with a blockchain in a block that corresponds to the aggregator service.

7. The method of claim 6, wherein the at least one authorization token is a hashed version of a block address of a record in the block.

8. A system, comprising:
   at least one processor; and
   a memory communicatively coupled to the at least one processor, the memory storing instructions which, when executed by the at least one processor, cause the at least one processor to perform operations comprising:
      receiving, at an authorizing service, a first communication from an aggregator service requesting issuance of an application client identifier (ID) that is associated with both the aggregator service and an application, the first communication indicating at least one scope governing access to the authorizing service, wherein the aggregator service is requesting issuance of the application client ID to access the authorizing service on behalf of the application;
      in response to the first communication, generating, by the authorizing service, the application client ID and issuing the application client ID to the aggregator service;
      receiving, at the authorizing service, a second communication from the aggregator service requesting issuance of at least one authorization token for an end-user of the application, the second communication including the application client ID; and
      in response to the second communication, generating, by the authorizing service, the at least one authorization token and issuing the at least one authorization token to the aggregator service that employs the at least one authorization token to access the authorizing service on behalf of the application, wherein the at least one authorization token is generated and issued based at least partly on receiving permission, from the end-user, to access data of the end-user maintained by the authorizing service, and wherein the at least one authorization token provides the access according to the at least one scope the permission is provided to access the data of the end-user according to the at least one scope.

9. The system of claim 8, wherein:

the first communication indicates a purpose for the access to the authorizing service by the application; and the application client ID is generated and issued based at least partly on determining that the at least one scope is appropriate for the purpose.

10. The system of claim 8, wherein the permission is received through a user interface (UI) dialog that is presented to the end-user by the aggregator service.

11. The system of claim 10, wherein:

the first communication includes a logo of the application; and the UI dialog is presented with the logo.

12. The system of claim 8, wherein the at least one authorization token includes a refresh token and an access token.

13. The system of claim 8, wherein:

the at least one authorization token is associated with a blockchain in a block that corresponds to the aggregator service; and the at least one authorization token is a hashed version of a block address of a record in the block.

14. One or more non-transitory computer-readable media storing instructions which, when executed by at least one processor, cause the at least one processor to perform operations comprising:

receiving, at an authorizing service, a first communication from an aggregator service requesting issuance of an application client identifier (ID) that is associated with both the aggregator service and an application, the first communication indicating at least one scope governing access to the authorizing service, wherein the aggregator service is requesting issuance of the application client ID to access the authorizing service on behalf of the application;

in response to the first communication, generating, by the authorizing service, the application client ID and issuing the application client ID to the aggregator service;

receiving, at the authorizing service, a second communication from the aggregator service requesting issuance of at least one authorization token for an end-user of the application, the second communication including the application client ID; and in response to the second communication, generating, by the authorizing service, the at least one authorization token and issuing the at least one authorization token to the aggregator service that employs the at least one authorization token to access the authorizing service on behalf of the application, wherein the at least one authorization token is generated and issued based at least partly on receiving permission, from the end-user, to access data of the end-user maintained by the authorizing service, and wherein the at least one authorization token provides the access according to the at least one scope the permission is provided to access the data of the end-user according to the at least one scope.

15. The media of claim 14, wherein:

the first communication indicates a purpose for the access to the authorizing service by the application; and the application client ID is generated and issued based at least partly on determining that the at least one scope is appropriate for the purpose.

16. The media of claim 14, wherein the permission is received through a user interface (UI) dialog that is presented to the end-user by the aggregator service.

17. The media of claim 16, wherein:

the first communication includes a logo of the application; and the UI dialog is presented with the logo.

18. The media of claim 14, wherein the at least one authorization token includes a refresh token and an access_token.

19. The media of claim 14, wherein:

the at least one authorization token is associated with a blockchain in a block that corresponds to the aggregator service; and the at least one authorization token is a hashed version of a block address of a record in the block.

* * * * *

UNITED STATES PATENT AND TRADEMARK OFFICE
CERTIFICATE OF CORRECTION

PATENT NO. : 10,887,301 B1  
APPLICATION NO. : 16/218191  
DATED : January 5, 2021  
INVENTOR(S) : Alejandro Vera et al.

Page 1 of 1

It is certified that error appears in the above-identified patent and that said Letters Patent is hereby corrected as shown below:

In the Claims

Column 22, Claim 18, Line 37, delete "access_token." and insert -- access token. --

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*